United States Patent
Smith, Jr.

(10) Patent No.: US 6,793,057 B1
(45) Date of Patent: Sep. 21, 2004

(54) ROTARY FRICTION SYSTEM

(76) Inventor: Robert P. Smith, Jr., 6815 Smith Rd., Simi Valley, CA (US) 93063

( * ) Notice: Subject to any disclaimer, the term of this patent is extended or adjusted under 35 U.S.C. 154(b) by 0 days.

(21) Appl. No.: 10/334,633

(22) Filed: Dec. 31, 2002

(51) Int. Cl.$^7$ .................................. F16D 13/68
(52) U.S. Cl. ................ 192/70.14; 192/107 R; 192/107 M; 192/113.26
(58) Field of Search .............. 192/70.14, 107 R, 192/107 M, 70.12, 113.26, 113.23

(56) References Cited

U.S. PATENT DOCUMENTS

| | | | | |
|---|---|---|---|---|
| 2,163,152 A | * | 6/1939 | Palm ........................ | 192/70.14 |
| 3,037,860 A | * | 6/1962 | Masterson et al. ............. | 419/6 |
| 3,191,734 A | * | 6/1965 | Batchelor et al. ........ | 192/70.14 |
| 3,552,533 A | * | 1/1971 | Nitz et al. ............. | 192/107 M |
| 3,850,277 A | * | 11/1974 | Adachi .................. | 192/107 M |
| 3,986,588 A | * | 10/1976 | Kuzarov ..................... | 192/16 |
| 4,119,179 A | * | 10/1978 | Masclet ..................... | 188/73.2 |
| 4,294,343 A | * | 10/1981 | Reh ..................... | 192/113.23 |
| 4,830,164 A | * | 5/1989 | Hays ..................... | 192/107 R |
| 5,099,973 A | * | 3/1992 | Flotow et al. .......... | 192/70.12 |
| 5,154,683 A | * | 10/1992 | Phelps ..................... | 192/70.14 |
| 5,167,312 A | * | 12/1992 | Thirion de Briel et al. ..................... | 192/107 R |
| 5,407,048 A | * | 4/1995 | Sievers ................... | 192/70.14 |
| 5,551,917 A | * | 9/1996 | Wood ......................... | 464/46 |
| 5,727,665 A | * | 3/1998 | Gonia et al. ............. | 192/70.14 |
| 2002/0014386 A1 | * | 2/2002 | Diemer et al. ........... | 192/70.14 |
| 2003/0164274 A1 | * | 9/2003 | Feldhaus et al. ........... | 192/48.8 |

FOREIGN PATENT DOCUMENTS

GB    2 150 654 A  *  7/1985

* cited by examiner

Primary Examiner—Rodney H. Bonck
(74) Attorney, Agent, or Firm—Marvin E. Jacobs (57) ABSTRACT

A rotary friction system, comprising: a flywheel, which comprises: a disk, comprising a plurality of coaxially disposed arcuate shaped recesses and a plurality of radially disposed channels; arcuate shaped pads matingly mounted therein the arcuate shaped recesses; a clutch disk, comprising: another disk, which comprises a plurality of coaxially disposed arcuate shaped cutouts; a plurality of other arcuate shaped pads, each of the other arcuate shaped pads having a raised step portion; the other arcuate shaped pads mounted thereon the other disk, having adjacent ones of the raised portions interleaved about the other disk, extending matingly therethrough the arcuate shaped cutouts in opposing directions; the flywheel adjacent the clutch disk. The rotary friction system has and maintains high energy transfer characteristics and high efficiency, during intermittent and frequent irregular application of high torque loads, high temperature and extreme heat conditions, is capable of not warping, even under extreme heat conditions.

7 Claims, 9 Drawing Sheets

ROTARY FRICTION SYSTEM

BACKGROUND OF THE INVENTION

1. Field of the Invention

The present invention relates generally to rotary friction systems and more particularly to flywheels and clutches having carbon-carbon friction material, and the like.

2. Background Art

Rotary friction systems and the like have been known. Such rotary friction systems include flywheels and clutch disks, and are typically associated therewith transferring drive power from engines to transmissions, especially in automotive and vehicle applications. Typical automotive or vehicle clutch disks and flywheels have frictional linings, which have large metallic base rings, the underlying theory of which most often is that the high heat conductivity of a metal base ring enhances heat transfer, and thus reduces the tendency of clutch linings and flywheels to overheat.

With the demand for increased performance, limitations in size, and the demand for increased torque to be transmitted through the flywheels and clutches, the tendency has been to construct as large diameter clutches and flywheels as possible, and overload clutch disks and flywheels, to achieve maximum moment arms, and handle the large torques transmitted therethrough the flywheels and the clutches. The transfer of large amounts of kinetic energy, and the variation of heat applied to different portions of the flywheels and the clutches, the outer portions of which are often subjected to substantially higher temperatures than the inner portions, results in overheating and warping of the flywheels and the clutches, decreased surface area contact, and poorer energy transfer, which results in yet more heat and warping, slippage between the flywheels and the clutch disks, degradation of materials, and eventually the need to replace the flywheels and/or the clutches.

Previous rotary friction systems used asbestos facings; however, there has been a transition to new materials, which has still not solved the aforementioned problems, including, in particular, organic composite facings, as a result of environmental hazards and health concerns associated therewith the asbestos facings. The organic composite linings, however, are particularly sensitive to high temperatures, and result in decreased performance at such temperatures, warping of the flywheels and clutches, as well as chattering, high wear, and maintenance of the flywheels, clutch disks, and associated frictional facings.

There is thus a need for a rotary friction system, which has and maintains high energy transfer characteristics and high efficiency, during intermittent and frequent irregular application of high torque loads, high temperature and extreme heat conditions. The rotary friction system, including the flywheels and clutches, should be capable of not warping, even under extreme heat conditions, maintain surface area contact, minimize slippage between the flywheel and the clutch disk, improve long term energy transfer and efficiency, maintain material properties, be light weight, durable, long lasting, and may be manufactured or retrofit with replacement parts quickly, easily, and efficiently.

Different rotary friction systems have heretofore been known. However, none of the rotary friction systems adequately satisfies these aforementioned needs.

Flywheels, clutches, brakes, and friction disks have been disclosed.

U.S. Pat. No. 4,830,164 (Hays) discloses a heat puck for clutches and flywheels, which has a trapezoidal shape with a steel base plate and a thick layer of a high heat capacity material such as copper. The heat puck is attached to either or both the pressure plate and flywheel of an otherwise conventional automotive clutch assembly. Preferably a circular array of heat pucks are mounted on a respective plate or flywheel. The puck is mounted with a large diameter shoulder member that extends through an aperture in the puck, and is received in an aligned receptacle in the surface of the plate or flywheel. A screw or rivet fastener extends through the shoulder member, puck and plate or flywheel to retain the assembly. The shoulder member provides the necessary torque resistance to the assembly, protection the fastener from stress failure.

U.S. Pat. Nos. RE37,548 and 5,184,704 (Hays) disclose a conversion for a clutch of a motor vehicle, which uses a conventional Belleville spring to bias a pressure plate and clamp a clutch disc between the pressure plate and the flywheel of the vehicle. Frictional linings of the conventional clutch are substituted by frictional linings, which are preferably located at optimum geometric spacing, and which have from 30–70 percent less surface area for frictional engagement than that conventionally furnished with the clutch. The conversion is particularly applicable to upgraded performance cars.

U.S. Pat. No. 5,355,986 (Biswas) discloses a clutch and disc brake friction assembly, for use on medium and heavy duty vehicles, which includes a metallic shoe having an exposed backing surface provided with a plurality of relatively spaced protuberances projecting therefrom. A sheet metal attachment lamina overlies the backing surface, and is provided with a plurality of holes through which the protuberances extend. Subsequent to the distal ends of the protuberance having passed through the holes, the holes are enlarged thereby affixing the attachment lamina to the backing surface. The attachment lamina has a plurality of openings relatively arranged to form a grid-like configuration. The openings are separated from one another by narrow elongated segments, each having a V cross-sectional configuration, with the sides thereof diverging from a shoe backing surface. A high temperature adhesive lamina overlies the backing surface and the divergent sides of the narrow elongated segments of the attachment lamina. A friction lamina overlies the adhesive lamina and the attachment lamina, whereby the divergent sides of the elongated segments and the adhesive lamina become embedded in the friction lamina.

U.S. Pat. No. 5,158,165 (Flotow) discloses a backing plate for connection to a clutch disc, which includes a pair of spaced friction material portions (or pads). A central channel extends between the two portions to allow air to flow over and cool a central area of the friction material. Clearances are defined at radially inner and outer areas of the channel and receive rivets to secure the backing plate to a clutch disc. The rivets are positioned radially between the radially inner and radially outer edge of the friction material, such that the backing plate is firmly secured to the clutch disc to prevent bowing. The improved backing plate ensures that the backing plate remains firmly secured to the clutch disc, and that the friction material is adequately cooled such that it efficiently transmits rotational forces from a drive source to a driven shaft.

U.S. Pat. No. 6,247,382 (Umeki, et al.) discloses a composite material flywheel device, which has a ring made from a composite material of carbon fiber reinforced plastics and a spoke member inserted in the ring. The spoke member is made from the fiber reinforced plastics having a lower modulus of elasticity than that of the ring. A tapered bush is press-fitted into a center portion of the spoke member. Both of the tapered bush and the spoke member are tightly fixed on a shaft by a first spring supported by a holder, and by a second spring urging the holder, so as to prevent vibrations, due to looseness thereof.

U.S. Pat. No. 5,123,514 (Gatins, Jr.) discloses a clutch or brake system for a heavy duty vehicle, having an assembly which includes a shoe having an exposed surface on which is attached a carrier member. A friction liner is molded onto the carrier member, which is provided with a plurality of apertures, each having a peripheral flange embedded into a concealed surface of the liner. The attachment of the carrier member to the shoe exposed surface permits relative adjustment therebetween, when the assembly is in a braking or clutching mode, so as to compensate for any differential in coefficients of thermal expansion between the shoe and the carrier member on which the liner is molded.

U.S. Pat. No. 5,092,443 (Nomura) discloses a clutch disc assembly in which facings comprising cerametallic pads- secured to back plates are secured to opposite faces of a plate at an outer peripheral part of a clutch disc, characterized by that a heat insulating material is held between the plate and a back plate on the opposite faces, the insulating material having a thickness gradually increasing from a radial inside to a radial outside of the clutch disc. The clutch disc assembly is directed toward preventing failure in engagement and disengagement of the clutch, by preventing a strain caused by heat produced on the part of the plate on which the facings are provided.

U.S. Pat. Nos. 5,033,599 and 4,951,793 (Hays) discloses a clutch with dissimilar frictional facings and centrifugal assist, in which frictional engagement faces of a clutch are provided with an organic composite facing and a sintered metal facing. The benefits of both types of facings are obtained without many of the disadvantages that formerly plagued the use of these facings. The organic composite facing provides the low temperature service for the clutch, with a suitably high coefficient of friction, which is relatively constant from ambient to several hundred degrees F. The sintered metal facing provides high temperature service for the clutch. Thus, when the organic composite facings reach their maximum service temperature of around 500 degrees F., the sintered metal facings provide their optimum coefficient of friction, resulting in a subassembly in which the overall or average coefficient of friction remains substantially constant from ambient temperatures to the maximum service temperature of the sintered meta coatings, in excess of 900 degrees F. The result, when incorporated in an automotive clutch, is a clutch having a smooth, non-vibrational action, which does not exhibit premature wear and failure.

U.S. Pat. Nos. RE36,363 and 4,846,326 (Tilton, et al.) discloses a carbon to carbon friction clutch, in which carbon input disks are coupled to a flywheel by radial slots in their peripheries. Carbon input disks are coupled to a drive shaft by means of inner, radial slots and a metallic hub which contains slot-matching fingers. The input and output disks, as well as the hub, are axially free standing when the clutch is disengaged. The design distributes load more uniformly over the carbon plates than previous devices and allows greater service life of the clutch.

U.S. Pat. No. 5,769,973 (Smith, Jr.) discloses a high performance automotive clutch with modified pressure plate for sustained increased spring force. A Belleville spring pressure plate of increased height, for use in a high performance clutch assembly, exerts a greater force than the original height plate, is usable without modification of the original clutch, and is longer lasting in service, after being thermally conditioned to a martensitic state, to lose the memory of its original, lower height, and being stress tempered before being set in a new, increased height shape.

U.S. Pat. No. 5,415,262 (Bernal, et al.) discloses a carbon to carbon friction mechanism, which includes a lightweight pressure plate directly mounted to an adjacent carbon plate, so that the pressure plate is kept concentrically aligned during operation of the mechanism. The directly mounted pressure plate and adjacent carbon plate may be used as components of a carbon to carbon friction clutch. Sufficient clearances are provided between the pressure plate and its adjacent carbon plate, to allow for thermal expansion of the materials used for the pressure and carbon plates.

U.S. Pat. No. 6,155,397 (Killian) discloses a clutch driven disc assembly, which includes a hub and an annular spring plate fixed to the hub. A friction disc assembly is mounted concentric with an axis of rotation of the hub and is rotatably relative to the spring plate. A plurality of drive springs are operably disposed between the spring plate and the friction disc assembly. The friction disc assembly further includes a reinforcing plate and a substantially annular disc fixed to the reinforcing plate. A friction material button is fixed to the substantially annular disc. The friction material button has a metallic friction material cookie with at least three apertures. A backer plate is fixed to the friction material. The backer plate covers the apertures in the friction material cookie. At least three spot welds are within three corresponding apertures in the cookie. At least one of the welds is offset from a line joining two others of the welds. The welds join the substantially annular disc and the backer plate, in turn fixing the friction material button to the substantially annular disc.

U.S. Pat. No. 4,860,872 (Flotow) discloses a friction disc assembly, which includes a plurality of one piece or unitary friction elements, each containing a pair of opposed planar friction surfaces. Each element is adapted for being supported within an opening of a clutch driven disc, wherein a pair of backing plates virtually supports each disc, by trapping same within pairs of aligned openings. In a preferred form, the backing plates comprise an interference fit with the axially aligned boundaries of associated friction surfaces, and rivets, which hold the backing plates rigidly to the driven disc, are spaced from and hence out of contact with the friction elements. In a preferred form, each friction element includes a radially extending tongue, which has a thickness equal to the thickness of the driven disc.

U.S. Pat. No. 4,977,991 (Mahoney) discloses a multiple disc clutch, which comprises interleaved first and second sets of friction discs mounted for rotation of one disc set relative to the other disc set about an axis, the disc sets being shiftable axially of each other; a flywheel plate for mounting in driving engagement to a source of torque; and a plurality of separately formed dowels, for securing to the flywheel plate at its circumference, at circumferentially spaced locations, the dowels projecting axially therefrom through corresponding circumferentially spaced apertures adjacent the radially outward edge of the second disc set, for driving engagement with the second disc set, the number and spacing of the dowels being chosen with respect to the circumference of the second disc set, to promote air cooling of the multiple disc clutch, by circulation of air around the dowels and between discs of the disc sets.

U.S. Pat. No. 6,070,707 (Hofmann, et al.) discloses a friction clutch, in which an axial play is provided between an inner disk and a hub of a clutch disk. The axial play can be influenced by a device during assembly of the friction clutch in an engine and transmission of a motor vehicle drive train, such that the hub is displaced, within the axial play, into the position in the axial play, which lies closest to a flywheel of the friction clutch.

U.S. Pat. No. 5,857,546 (Hofmann, et al.) discloses a multiple-disk friction clutch, especially for motor vehicles, with a hub which has an internal toothing and can be placed on a gear shaft, so as to be rotationally fixed relative thereto. At least two clutch disks are connected with the hub, so as to be rotationally fixed relative thereto and project radially beyond the hub. A stop, which guides the hub axially relative to the clutch disks, is provided between the clutch disks. The hub is formed of two parts, and includes a hub body having an outer toothing and a hub ring, which has the same outer toothing, and sits on a radial shoulder of the hub body. The outer toothing of the hub ring is offset by one tooth relative to the toothing of the hub body, to form the stop for the clutch disks. The hub body and the hub ring are connected with one another, so as to be rotationally fixed relative to one another.

U.S. Pat. No. 6,035,987 (Fukuda) discloses a multi-plate clutch of a boss driving type, with structure to make it easy to replace a boss, and to limit the number of parts. The clutch includes a flywheel, a boss, a clutch cover assembly, and input-output friction members, such as clutch disks, an intermediate plate, and a pressure plate. The boss is detachably coupled to the flywheel, and includes an annular portion and a plurality of columnar portions, which are formed integrally with the annular portion. The columnar portions extend in an axial direction from the annular portion. Each of the columnar portions is disposed circumferentially next to one another in a circular pattern, with a radial pass-through space formed therebetween. The clutch cover assembly includes a clutch cover, which is detachably coupled to the boss, a pressure plate, and a diaphragm spring assembly. The clutch disks and the intermediate plate are disposed between the friction face and the pressure plate.

U.S. Pat. No. D395,325 (Fukuda) also discloses a friction clutch, especially for automotive racing applications.

U.S. Pat. No. 5,638,932 (Mizukami) discloses a dry multi-disk clutch. A clutch cover assembly is used with clutch friction disks of a dry multi-disk clutch, and is provided with a diaphragm spring, a clutch cover and a support structure. The outer periphery portion of the diaphragm spring loads the clutch friction disks. The support structure includes a first annular disk-like annular ring member possessing a first ring main body, which contacts a portion of the diaphragm spring from the clutch cover side, and a seating portion, which extends from the first ring main body, and seats against the clutch cover, a second annular disk-like annular ring member possessing a second ring main body, which contacts the diaphragm spring on the side opposite the first annular disk-like annular ring member, and bolts for fixing the first and second annular disk-like annular ring members to the clutch cover. One purpose of the invention is to suppress clutch cover wear, caused by annular disk-like wire rings. A hub flange having a boss and a flange extending from the boss to the outer periphery, where a drum-shaped element is formed, which extends axially to opposite sides of the outer periphery of the flange. Plural annular drive plates and plural annular driven plates are disposed between a flywheel and the clutch cover. In the flange, passage openings are formed, which provide air flow. In the two axially projecting portions of the second drum-shaped element, there are formed air passage holes, the openings and holes preventing the temperature in the friction disks in the dry multi-disk clutch from rising excessively.

U.S. Pat. No. D402,299 (Mizukami) also discloses a dry multi-disk clutch, especially for automotive racing applications.

U.S. Pat. No. 5,301,779 (Nash) discloses a friction clutch, which includes a hub and driven plate assembly, in which three carbon driven plates are mounted on a hub, the hub having radially outwardly extending splines thereon, and the driven plates having radially inwardly extending teeth, for engagement with the splines, such that the hub can slide axially relative to the driven plates, when the driven plates are held axially by driving plates. Roll pins are each held in holes through two adjacent splines, such that the roll pins are between the driven plates, and limit axial movement of the hub relative to the driven plates.

U.S. Pat. No. 5,558,186 (Hyde, et al.) discloses a friction disk assembly, which comprises an annular structural carrier including a plurality of recessed regions and torque drive notches spaced around its circumferential direction, and a friction lining mounted on the carrier, the friction lining having a flat wear (rubbing) face and an obverse face including raised areas corresponding to and matingly engaging the recessed regions of the carrier to prevent rotation of the lining relative to the carrier. The carrier may be formed of steel or other suitable structural material. The lining may be formed of virgin or recycled carbon, ceramic or other suitable friction material. The lining may be retained to the carrier by rivets, and may be provided with a structural casing configured to engage the recessed regions of the carrier. The assembly may be refurbished by simple replacement of the worn lining. The carrier and the lining may be formed as unitary annular members or as segments of annular members.

U.S. Pat. No. 3,708,042 (Krause) discloses a friction disk for a disk brake having a plurality of interleaved brake rotor and stator disks, which are forced together to provide a friction effect. The rotor is provided with a plurality of segments, each of which include a carbon block having friction material pads fixedly secured to opposite faces thereof. The segments are attached to a ring or strap, which holds the segments in fixed spaced-apart relationship to define an annular rotor disk.

U.S. Pat. No. 5,709,288 (Riebe) discloses a friction disk assembly, comprising an annular structural carrier, including a plurality of recessed and/or raised regions and torque drive notches spaced around its circumferential direction, and a segmented friction lining mounted on the carrier. Each segment of the friction lining comprises a clamshell-shaped friction cup including a pair of cup members containing a puck of friction material, each pair of cup members being joined by a deformable strap and together defining a U-shaped configuration. The obverse side of each cup member includes projections and/or depressed areas that are complementary in size, shape and location to the recessed and/or raised regions of the associated carrier operatively engaged therewith, to prevent movement of the lining relative to the carrier during a braking event. The carrier may be formed of steel or other suitable structural material. The lining may be formed of suitable friction material, e.g. sintered metal. The lining may be retained to the carrier by rivets that pass through lugs extending from the cup members. The friction pucks are provided with a structural casing configured to engage the recessed and/or raised regions of the carrier. The assembly may be refurbished by simple replacement of the worn lining together with its associated structural casing.

U.S. Pat. Nos. 3,712,427 and 3,800,392 (Cooke, et al.) disclose a brake disk assembly in the form of a carbon or graphite disk, which is provided on both sides with thin wear plates of carbon or graphite material. The plates are either in segmented or full circle form, and are secured to the core by rivets and bushings, which also secure keyway drives of the disks.

U.S. Pat. No. 4,613,021 (Lacombe, et al.) discloses a disc brake disk comprising a core designed to withstand mechanical stresses, the core including a hub, a plurality of spokes surrounding the hub and hooks at the end of the spokes, each of the spokes having two opposite flat faces and two opposite edges, removable friction pads fitted on both sides of the core, each of the friction pads including a plurality of annular sectors, each sector having an axially outside friction surface and an axially inside mounting surface with lands and recesses, each sector having a radially outer edge with an oblique surface and a radially inner edge with an oblique surface, the hooks cooperating with the oblique surfaces of the outer edges of the sectors to form stops against both axial and radial movement of the sectors, the lands of the sectors on each side of the core bearing axially against one another back to back, each sector covering two angular spaces between spokes by overlapping one middle spoke and halves of two side spokes, the lands and recesses comprising a radial center slot having a bottom and edge walls and two radial half-width slots in the ends of the sector, the edge walls cooperating with the edges of the middle spoke for radial guidance and annular locking of the sector, a clearance being left between the bottom and the flat surface of the middle spoke, the half-width slots leaving room with clearance for the side spokes, the sectors on one side of the core being offset circumferentially relative to the sectors on the opposite side of the core by a half-sectors breadth and spring rings attached to the hub pushing elastically against corresponding oblique surfaces of the inner edges of the sectors so as removably to mount the sectors on the core.

U.S. Pat. No. 5,769,185 (Main, et al.) discloses carbon brake disc assemblies and methods for making the same, which allow for increased carbon utilization. In one embodiment of the invention, worn or spent discs from a carbon brake disc assembly are used to fabricate new brake discs. The separate discs, individually unsuited for further use in a brake assembly, are secured together with like wear material and subjected to chemical vapor infiltration to configure a disc suitable for use as a new disc. In other embodiments, previously used discs or new carbon material is employed to configure wear pads or wear discs, which are affixed to opposite sides of a carrier plate, and then subsequently used in a brake disc assembly. In all of the embodiments, carbon screws or threaded rods are employed to hold the components of the disc together. Such carbon screws or threaded rods are fabricated from otherwise worn or spent carbon discs or from new carbon.

U.S. Pat. No. 4,825,981 (Otto, et al.) discloses an axially split brake disk, which includes two brake bands, that form a brake ring, and which are interconnected by ribs. The brake disk further includes two brake ring halves, that are separated by concentric and radially extending seams of division, in each of which one of the brake ring halves is provided with a projection that extends in a concentric direction, while the other brake ring half is provided with a corresponding U-shaped recess, that accommodates the projection. The width of the projection is less than the width of the brake ring, as measured in a radial direction. The projection of the one brake ring half, as well as that portion of the other brake ring half in which the recess is provided, are provided with corresponding radially extending bores for receiving a holding mechanism, such as a sleeve-like or rod-like member, that is provided with pin-like elements, for preventing the holding mechanism from shifting in a radial direction relative to the brake ring halves.

U.S. Pat. No. 4,018,311 (Tickle) discloses a rotor and braking ring disc assembly, for use in a railway disc brake, comprising a plurality of arcuate elements or segments of a braking ring, which are attached to the rotor so that each element or segment can thermally expand and contract relative to the rotor, and pairs of circumferentially spaced locating abutments for preventing radial inward and outward movement of the element or segment relative to the rotor at predetermined locations, which are selected, so that when the element undergoes thermal expansion or contraction with respect to the rotor, there is no movement of the element into or out of engagement with the abutments. The abutments may take the form of radial projections on the element or segment or rotor, which projections are urged into engagement with a groove in the rotor or disc element, respectively by further abutments, such as in the form of camming wedges or springs. Alternatively, the abutments may be lateral projections on the rotor, which are a sliding fit in elongated grooves in the element or segment.

U.S. Pat. No. 4,132,294 (Poli) discloses a brake disc with replaceable linings, for brake-discs, comprising a hub provided with a circumferential radial flange structure extending therefrom, and having front and rear annular faces; at least two sector shaped lining parts, which together form an annular assembly, each part being of monolithic construction, and including confronting front and rear sector-shaped linings, all of the linings together forming front and rear annular linings, the outer surfaces of which are acted on by braking jaws, during use of the assembly, each of the parts being removably fitted over the flange structure in concentric relationship with the hub, so that the front and rear faces of the flange structure lie between the opposed surfaces of the confronting front and rear sector-shaped linings, the linings having radially extending inner ribs projecting therefrom, so as to form cooling passages, open at both their radial inner and outer ends, at least some of the ribs having edges, which serve as guides for the lining parts, during fitting of the latter over the flange in a radial direction, the rib edges engaging the flange structure in the completed brake disc assembly; and for each sector-shaped lining part, a single removable connecting element extending parallel to the axis of the hub and connecting the respective lining part with the flange structure, each of the connecting elements being located approximately at the center of the respective lining part.

U.S. Pat. No. 4,903,801 (Kobelt) discloses an internally air cooled brake disc assembly, manufactured by casting in small pieces, for eliminating problems associated with casting large discs with integral air cooling passages. The assembly has a main disc member and a plurality of disc segments secured to the main disc member. The disc segments are separate entities, and can expand and contract independently of each other, thus, reducing distortion from thermal effects. Assembled outer surfaces of each disc segment are generally flat, and provide an annular surface to be swept by brake pads. The inner surface of each disc segment has a plurality of ridges and at least one groove, for spacing the ridges apart. The ridges contact the main disc member, so that at least one passage is formed between the disc segment and the disc member, to receive a flow of cooling air. When the disc segments are secured on each side of the main disc member, the disc assembly has a plurality of cooling passages on each side of the main disc member. An optional external fan means can be provided adjacent inner ends of each disc segment, to provide a forced flow of air over the outer surfaces of the disc.

U.S. Pat. No. 6,334,515 (Martin) discloses a brake disk for disk brakes of vehicles, which is made of a material of the carbon group, the brake disk being formed as a ventilated brake disk, made up of two individual friction rings, which are undetachably connected with one another. The two friction rings are connected with one another by way of pins, which have a thickened center part and end parts, which are set off thereto. The end parts are fitted into respective bores in the friction rings.

U.S. Pat. No. 5,005,676 (Gassiat) discloses an improved rotor for a disk brake, having a multi-piece construction. The rotor has a central web extending around a driving drum portion, such that the web defines several generally radially extending cooling passages. The central web is mounted on the driving drum portion, so as to be capable of sliding laterally, but may not rotate relative to the driving drum. Friction elements, completely separate from the central web, are located on either side of the central web, and are mounted on the driving drum, so as to be also capable of lateral movement. The friction elements are also prevented from rotating relative to the driving drum portion of the rotor.

U.S. Pat. No. 4,745,996 (Wirth) discloses a brake ring for brake disks, especially disk brakes for rail vehicles, consisting of two annular bodies arranged adjacently at a distance from each other, having stud bolts bridging the distance and rigidly connected with the annular bodies. The stud bolts are so arranged, for the purpose of the most even distribution possible, that the axes of the stud bolts extend through the intersecting points of three systems of straight lines, extending in one radial plane. The straight lines of the first system are parallel, and are at an equal distance from each other; the second system of straight lines is formed by a rotation of 60 degrees from the first system of straight lines; and the third system of straight lines is formed by a rotation of 120 degrees from the first system of straight lines. Preferably, the ratio of the distance of the stud bolt axes and the diameter of the stud bolts is approximately 1.7. The brake ring has only minor aeration losses, but high heat transmission by cooling air. When the brake ring heats up, the stresses within the annular bodies and the stud bolts are evenly distributed, and the risk of fracture is reduced.

U.S. Pat. No. 4,263,992 (Moore, et al.) discloses a fabricated disc brake rotor assembly, in which a brake disc rotor is formed from two disc shaped members, with each disc having a flat surface and integrally formed fins extending from an opposing surface thereof. The ends of the fins are welded together to form the rotor. The fins of one member are welded to a convoluted outer rim section of a hat, which is secured to a wheel bearing assembly.

U.S. Pat. No. 5,332,067 (Prud'homme) discloses a disk brake pad device, which includes a carbon-carbon lining pad. A pad is attached to a caliper, and at least one pad positioning surface of the caliper has at least one pad actuating piston emerging therefrom. A first plate element of heat-insulating material, called a screen element, is located against the positioning surface, and at least one second element of heat-insulating material, called a spacer element, of adequate thickness, having reduced frontal contacts is located against the first element. A carbon-carbon lining pad of high-temperature friction material is located against the second element. The first element and/or the second element acts to retain the lining pad and to fix the first element and/or the second element to the caliper.

U.S. Pat. No. 4,051,930 (Masclet) discloses a disc brake with graphite friction linings. The disc brake comprises a rotor and a stator, wherein the rotor and/or the stator includes a mounting member provided with a friction lining formed at least in part by a plurality of graphite plates, each plate having two flat side faces and a peripheral surface, which is perpendicular to the two flat side faces, each plate being received in a recess in a side face of the mounting member, each recess having a flat bottom surface, and being of a depth less than the thickness of the plate, the side wall of the recess being parallel to the peripheral surface of the plate and spaced from the peripheral surface of the plate by a distance greater than that necessary to permit thermal expansion and contraction between the mounting member and the plate. The graphite plates of one of the rotor and the stator are formed of polycrystalline graphite, and the other of the rotor and the stator is formed and/or has graphite plates formed of structural graphite.

U.S. Pat. No. 4,982,818 (Pigford) discloses a cyclic brake disc overhaul technique and structure. The cyclic carbon brake disc overhaul technique comprises the steps of splitting a worn carbon disc into two equal disc halves, machining the disc halves to a predetermined axial thickness, and then bonding the disc halves of predetermined thickness to a core member. The disc halves may include drive regions at respective ends thereof, or the halves may have the drive regions removed therefrom. The core member may have axially extending drive portions, such that the disc halves of reduced radial length define wear grooves with the drive portions.

U.S. Pat. No. 6,308,808 (Krenkel, et al.) discloses a brake disk for a vehicle disk brake, in which a material from the carbon group is used for an internally ventilated disk brake. Individual components, such as friction rings and ribs, are manufactured individually or partially together, and can be fastened to one another, using an unreleasable connection, such as high temperature welding or gluing.

U.S. Pat. No. 5,099,960 (Alev) discloses a composite brake disk and method of extending the braking service life thereof. The composite brake disk provides an integral brake disk, comprising two brake disks, each of the brake disks having a disk thickness of one-half the design required disk thickness, and the two disks being clamped together in planar face-to-face orientation, by fasteners to form the integral brake disk. The integral brake disk has an inboard-facing brake wear surface, provided by a wear surface of a first of the combined brake disks, and an outboard-facing brake wear surface, provided by the second of the combined brake disks. The integral brake disk is put into braking service for a first period after which refurbishment is required. The integral brake disk is refurbished by declamping the two disks and grinding the worn wear surfaces to planar specification. The two disks are recombined at the ground planar surfaces, and reclamped to form a new integral brake disk. The refurbished integral brake disk has an inboard-facing brake wear surface, provided by the second of the two disks, and an outboard-facing brake wear surface, provided by the first of the recombined disks, and may be used for an additional period of braking service.

U.S. Pat. No. 5,803,210 (Kohno, et al.) discloses a disk pad type brake comprises a rotor disk provided with a carbon-carbon composite material (a) as a friction member, and at least one pad provided with a carbon-carbon composite material (b) as a friction member, wherein the difference in thermal conductivity between the materials (a) and (b) is 30 to 450 W/m.multidot.K in the radial direction; and a multi-disk type brake comprises at least one rotor disk provided with a carbon-carbon composite material (c) as a friction member, and at least one stator disk provided with a carbon-carbon composite material (d) as a friction member, wherein the difference in thermal conductivity between the materials (c) and (d) is 30 to 450 W/m.multidot.K in the radial direction.

U.S. Pat. No. 6,450,303 (Keck, et al.) discloses a brake disc for motor vehicles, with a bowl-shaped brake-disc chamber having a wall region and a bottom region, and with a disc-shaped friction ring surrounding the brake-disc chamber coaxially with respect to a common mid-axis, the friction ring having, on its inner circumference, clearances, into which projections formed on the wall region of the brake-disc chamber engage for the play-free transmission of a torque acting on the friction ring to the brake-disc chamber.

U.S. Pat. No. 6,077,607 (Zornik) discloses a brake/clutch disc, such as for a vehicle. In known SiC/C—C composites, the SiC layer is implemented as a diffusion layer, so that Si occurs even comparatively far within a C—C basic body having an SiC boundary layer. The brake/clutch disk is directed to friction discs, consisting of an SiC/C—C composite, and having essentially the mechanical properties of C—C discs, but a longer service life and a broader field of use than said C—C discs. This is achieved by a graphitized, machined basic body, provided with an SiC coating, consisting of a subsequently applied melt. In addition, a manufacturing method for such discs is provided.

U.S. Pat. No. 5,634,535 (Fennell, et al.) discloses a composite brake disc, such as a carbon composite brake disc having reinforcement provided by layers of carbon fiber material, in which the drive region is provided with additional reinforcement in addition to that of the friction region, by laying or otherwise providing additional fiber reinforcement material substantially uniformly in the drive region.

U.S. Pat. No. 5,143,184 (Snyder, et al.) discloses a carbon composite brake disc, with positive vibration damping, in which a carbon composite aircraft brake disc is manufactured to include an insert member, which effects positive vibration damping of the disc during operation of the brake.

U.S. Pat. No. 6,376,431 (Matsumoto, et al.) discloses reduced wear carbon brake material, which is carbon/carbon composite, comprising crystalline silicon carbide, which is essentially uniformly distributed on both internal and external surfaces of the composite in a low concentration, as well as a process for producing the composite and the use of the composite in brake materials for industrial roll goods, automotives, trucks, trains and aircrafts. It has been discovered that small amounts of crystalline silicon carbide uniformly distributed throughout the carbon/carbon composite results in reduced wear with either no change or a slight increase in the friction coefficient.

U.S. Pat. No. 5,868,888 (Don, et al.) discloses a method for near net-shape fabrication of friction disk ring structures, in which trapeziform paneled strips of friction paper or cloth are folded to make uniform 2-ply disks.

U.S. Pat. No. 5,454,990 (Chareire, et al.) discloses a process for the production of a part, particularly a carbon-carbon brake disk and to the part obtained In a process for manufacturing a carbon-carbon component, in particular a brake disk, a porous substrate in the shape of a brake disk is formed exclusively from carbon fibers. Holes, having axes parallel to the axis of rotation of the disk, are made in the substrate and are arranged on concentric circles centered on the axis of rotation. Areas free of holes are provided around keyways in the disk. The substrate is then impregnated by chemical vapor phase deposition. The holes in the substrate reduce the path of the gas in the substrate.

U.S. Pat. No. 3,069,209 (Bauer) discloses a method of bonding a bimetallic casting, the bond exhibiting improved heat transfer characteristics, and allows reduction in weight of certain components, such as brake drums.

U.S. Pat. No. 5,957,251 (Jones, et al.) discloses brake or clutch components having a ceramic-metal composite friction material, in which a braking component, such as a brake pad, brake rotor, brake drum or clutch disk is comprised of a metal substrate, having a friction material laminated on at least a portion of at least one face of the metal substrate, the friction material being a ceramic-metal composite comprised of a metal phase and a ceramic phase dispersed within each other, wherein the ceramic phase is present in an amount of at least about 20% by volume of the ceramic-metal composite. In particular, the braking component is a metal substrate, such as aluminum, having laminated thereto a ceramic-metal composite of a dense boron carbide-aluminum composite having high specific heat and low density.

U.S. Pat. No. 5,857,550 (Atmur, et al.) discloses a polymer derived fiber reinforced ceramic matrix composite clutch, in which a structural fiber reinforced ceramic matrix composite (FRCMC) material is adapted for clutch use. The entirety of the frictional components of a clutch mechanism or only particular components thereof can be made of the FRCMC material. One embodiment has integrally molded fiber reinforced ceramic matrix composite clutch friction pads, forming the friction surfaces of metal clutch parts. Clutch components exhibiting a higher temperature and wear-resistance.

U.S. Pat. No. 5,655,637 (Hays) discloses an automotive clutch with improved heat shield, having a pressure ring, preferably formed of aluminum, with a heat shield, that includes a thin outer metallic ring, preferably of steel, which is laminated to a layer of an adhesive resin, that contains metallic elements, which are in substantially direct heat exchange between the outer steel ring and the aluminum pressure ring. For this purpose, copper screen of suitable mesh, from 10 to about 20 U.S. Standard, is embedded in the adhesive resin layer, reinforcing the adhesive layer, and providing a controlled degree of direct heat transmission from the steel ring to the aluminum ring. In preferred embodiments, the attachment of the steel ring to the pressure ring is enhanced by a plurality of countersunk, flush head fasteners, which are spaced about the periphery of the ring in a regular geometric array. Optionally, a plurality of slots are provided in the steel ring to compensate for the differences in thermal expansion of the steel ring and the aluminum pressure ring.

For the foregoing reasons, there is a need for a rotary friction system, which has and maintains high energy transfer characteristics and high efficiency, during intermittent and frequent irregular application of high torque loads, high temperature and extreme heat conditions. The rotary friction system, including the flywheels and clutches, should be capable of not warping, even under extreme heat conditions, maintain surface area contact, minimize slippage between the flywheel and the clutch disk, improve long term energy transfer and efficiency, maintain material properties, be light weight, durable, long lasting, and may be manufactured or retrofit with replacement parts quickly, easily, and efficiently.

SUMMARY

The present invention is directed to a rotary friction system, which has and maintains high energy transfer characteristics and high efficiency, during intermittent and frequent irregular application of high torque loads, high temperature and extreme heat conditions. The rotary friction system, including the flywheels and clutches, is capable of not warping, even under extreme heat conditions, maintaining surface area contact, minimizing slippage between the flywheel and the clutch disk, improving long term energy transfer and efficiency, maintaining material properties, is light weight, durable, long lasting, and may be manufactured or retrofit with replacement parts quickly, easily, and efficiently.

A rotary friction system having features of the present invention, comprises: a flywheel, comprising: a disk, which comprises a plurality of coaxially disposed arcuate shaped recesses and a plurality of radially disposed channels; arcuate shaped pads matingly mounted therein the arcuate shaped recesses; a clutch disk, comprising: another disk, which comprises a plurality of coaxially disposed arcuate shaped cutouts; a plurality of other arcuate shaped pads, each of the other arcuate shaped pads having a raised step portion; the other arcuate shaped pads mounted thereon the other disk, having adjacent ones of the raised portions interleaved about the other disk, and extending matingly therethrough the arcuate shaped cutouts in opposing directions; the flywheel adjacent the clutch disk.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–9 of the drawings. Identical elements in the various figures are identified with the same reference numbers.

Figure 1:
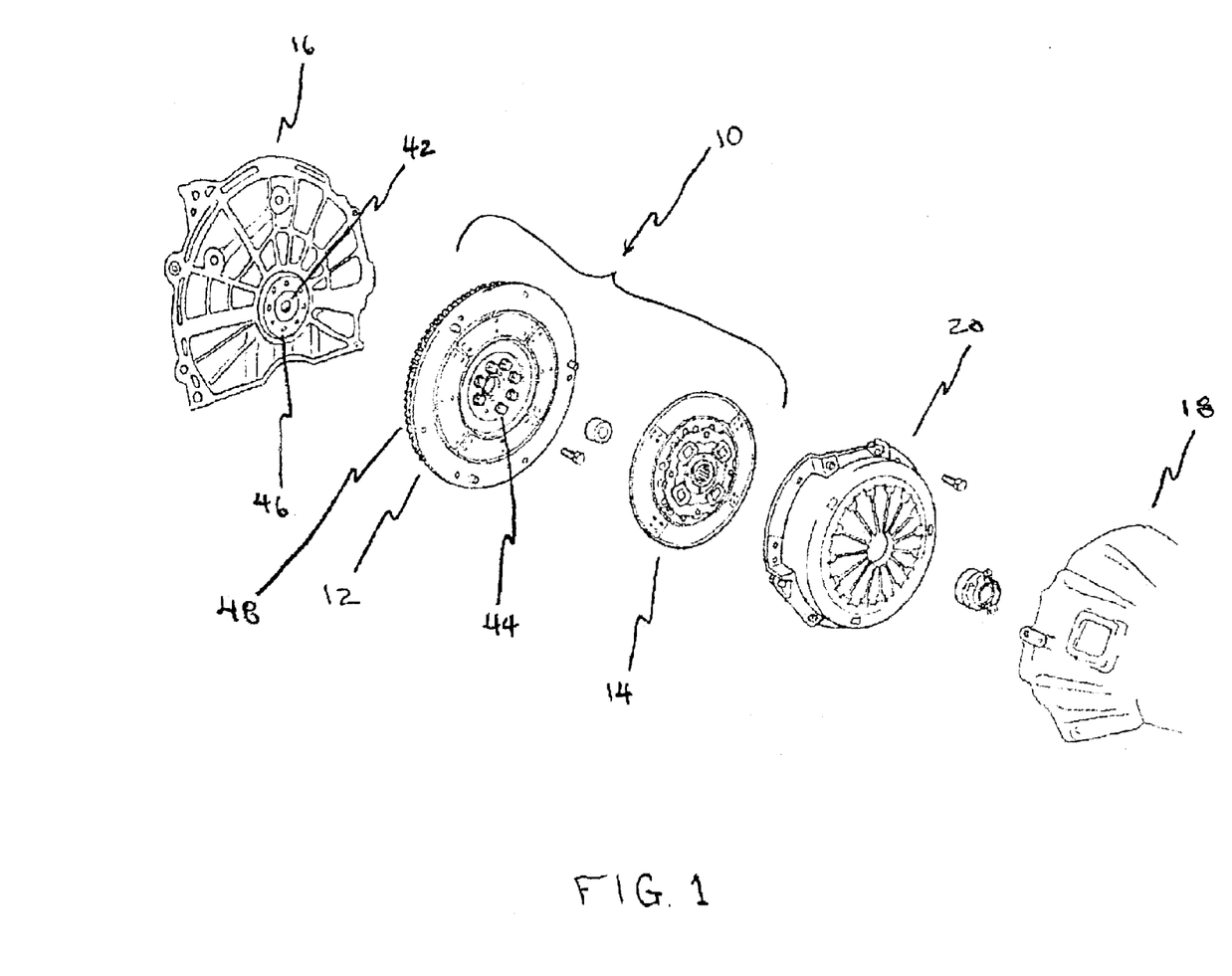
FIG. 1 is a perspective view of a rotary friction system, constructed in accordance with the present invention.

FIG. 1 shows an embodiment of the present invention, a rotary friction system 10, comprising a flywheel 12 and clutch disk 14, which are shown in a typical automotive application, associated therewith an engine 16 and transmission 18. Clutch cover 20 is also shown. The flywheel 12 and the clutch disk 14 may be used in conjunction with one another, as in the rotary friction system 10, or independently from one another, the flywheel 12 being capable of being used with alternate clutches, and the clutch disk 14 being capable of being used with alternate flywheels.

Figure 2:
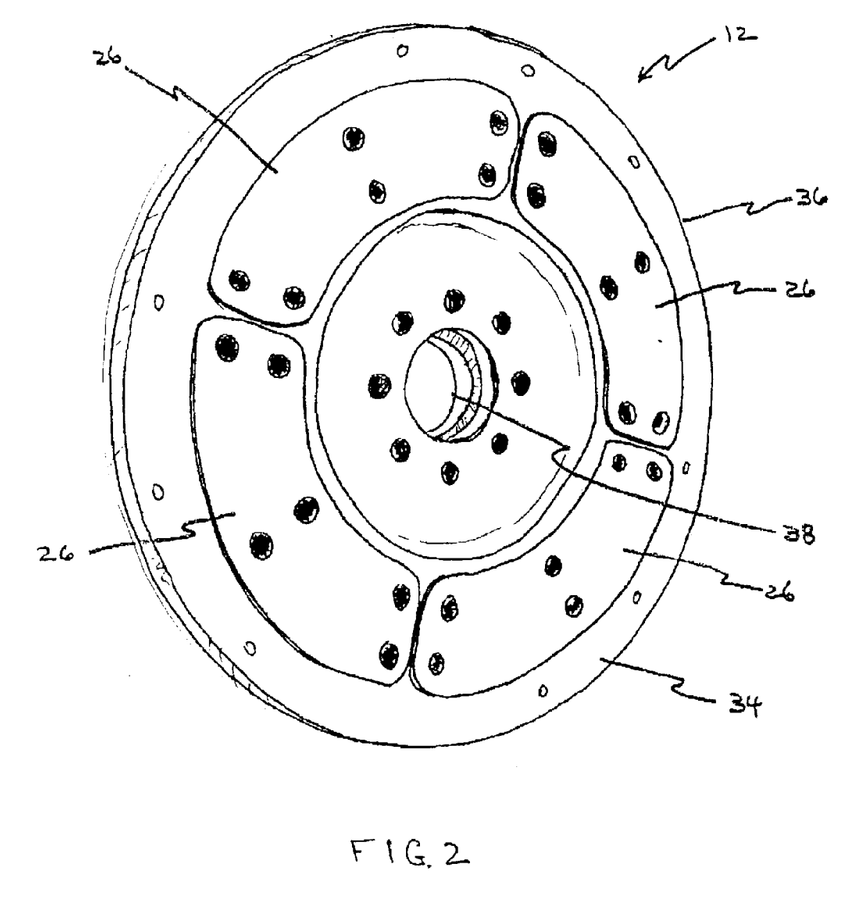
FIG. 2 is a perspective view of a flywheel of the rotary friction system of FIG. 1.
Figure 3:
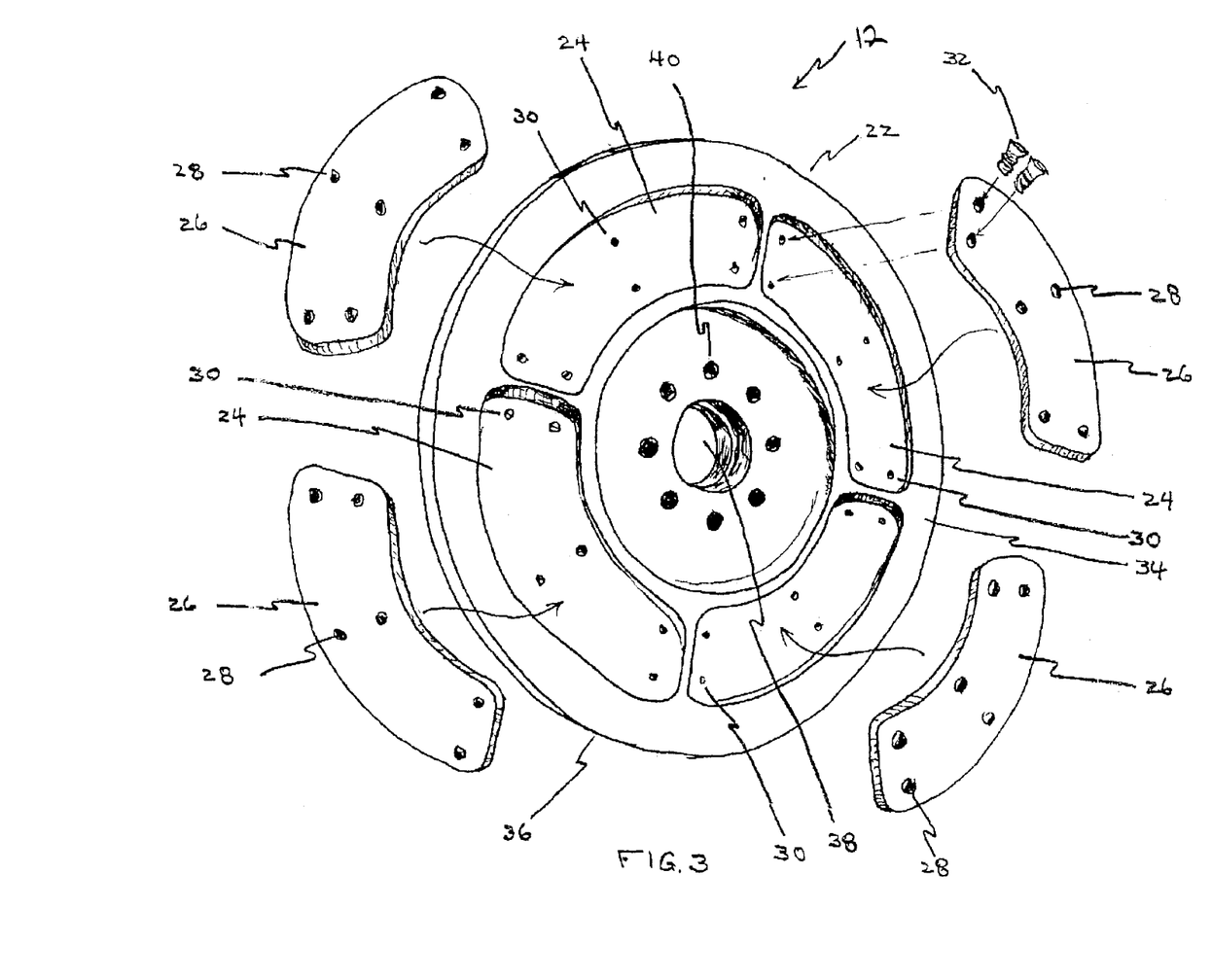
FIG. 3 is an exploded view of the flywheel of FIG. 2.

FIGS. 2 and 3 show an embodiment of the flywheel 12, comprising flywheel disk 22, having a plurality of coaxially disposed arcuate shaped recesses 24, the arcuate shaped recesses for matingly receiving arcuate shaped pads 26, which are preferably of carbon-carbon material, although other suitable materials may be used. The arcuate shaped pads 26 have countersunk holes 28, and the flywheel disk 22 has threaded receiving holes 30 for receiving screws 32 or other suitable fasteners, and fastening the arcuate shaped pads 18 thereto the flywheel disk 22, the arcuate shaped pads 18 extending above surface 34 of the flywheel disk 22.

The flywheel disk 22 has circumferential outer edge 36, axially disposed hole 38, and mounting holes 40 therethrough, the axially disposed hole 38 for locating the flywheel 12 substantially axially about engine drive output 42, and the mounting holes 40 for inserting bolts 44 or other suitable fasteners therethrough. The engine 16 has threaded receiving holes 46 thereabout the engine drive output 42, for receiving the bolts 44 or other suitable fasteners, and fastening the flywheel 12 thereto the engine 16. The flywheel 12 may also have optional ring gear 48 about the circumferential outer edge 36.

The arcuate shaped pads 26 of carbon-carbon material, or other suitable material, mounted therein the arcuate shaped recesses 24 provide the flywheel 12 with improved performance, eliminate warping, even under severe conditions, provide high energy transfer characteristics and high efficiency, during intermittent and frequent irregular application of high torque loads, high temperature and extreme heat, maintain surface area contact, minimize slippage between the flywheel 12 and the clutch disk 14, improve long term energy transfer and efficiency, maintain material properties, and make the flywheel 12 light weight, durable, long lasting, and capable of being manufactured or retrofit with replacement parts quickly, easily, and efficiently.

The flywheel disk 22 may be of metal, such as titanium, aluminum, aluminum alloy, stainless steel, steel, ductile iron, cast iron, or other suitable material. The arcuate shaped pads 26 may alternatively be of metal, such as titanium, aluminum, aluminum alloy, stainless steel, steel, ductile iron, cast iron, or other suitable material.

Figure 4:
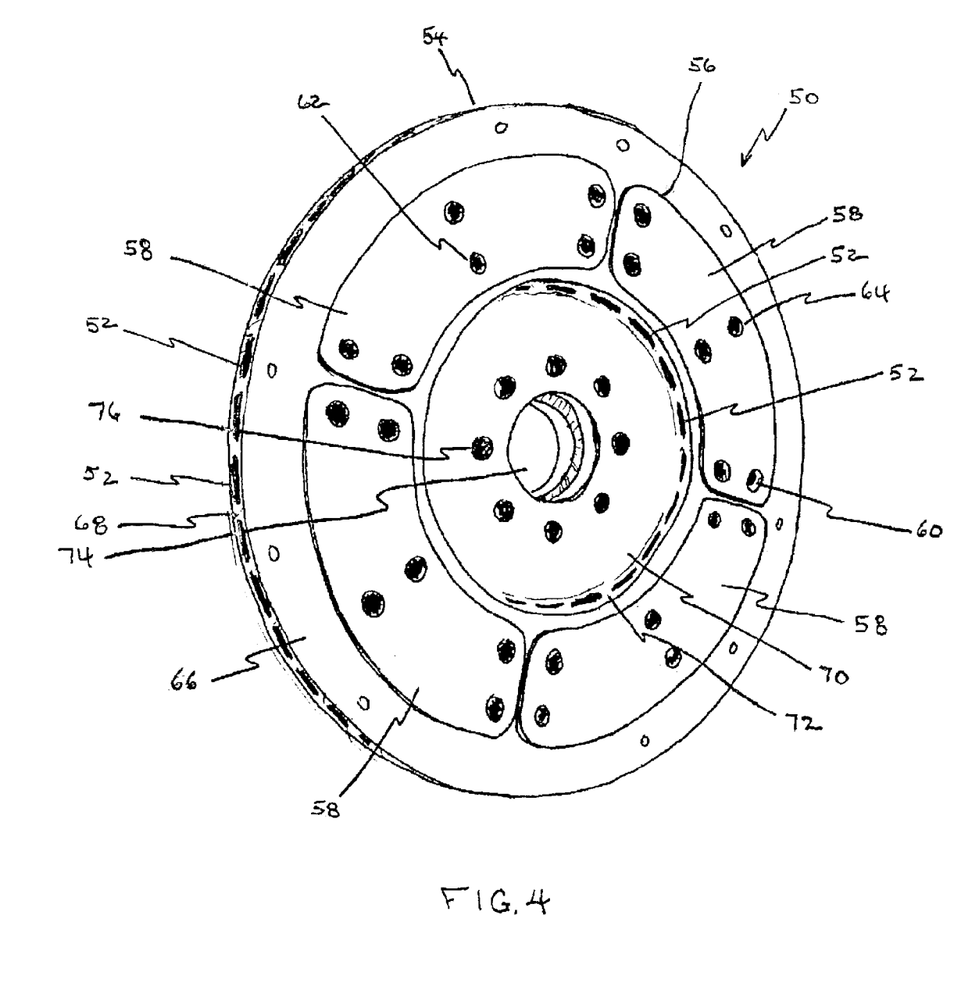
FIG. 4 is a perspective view of an alternate embodiment of flywheel of the rotary friction system of FIG. 1.

FIG. 4 shows an alternate embodiment of a flywheel 50, which is substantially the same as the flywheel 12, except that the flywheel 50 has radially disposed channels 52. The flywheel 50 comprises a flywheel disk 54 having a plurality of coaxially disposed arcuate shaped recesses 56 and the plurality of radially disposed channels 52 therethrough, the arcuate shaped recesses for matingly receiving arcuate shaped pads 58, which are preferably of carbon-carbon material or other suitable material.

The arcuate shaped pads 58 have countersunk holes 60, and the flywheel disk 54 has threaded receiving holes 62 for receiving screws 64 or other suitable fasteners, and fastening the arcuate shaped pads 58 thereto the flywheel disk 54, the arcuate shaped pads 58 extending above surface 66 of the flywheel disk 54. The flywheel disk 50 has circumferential outer edge 68, and axially disposed circular hole 70 therethrough, which form inner edge 72, the radially disposed channels 52 therebetween the circumferential outer edge 68 and the inner edge 72.

The flywheel disk 54 has axially disposed hole 74 and mounting holes 76 therethrough, the axially disposed hole.74 for locating the flywheel 50 substantially axially about engine drive output 40, and the mounting holes 76 for inserting the bolts 44 or other suitable fasteners therethrough. The engine 16 has the threaded receiving holes 46 thereabout the engine drive output 42, for receiving the bolts 44 or other suitable fasteners, and fastening the flywheel 50 thereto the engine 16, as in the flywheel 12. The flywheel 50 may also have an optional ring gear about the circumferential outer edge 68.

The arcuate shaped pads 58 of carbon-carbon material, or other suitable material, mounted therein the arcuate shaped recesses 56 provide the flywheel 50 with improved performance, eliminate warping, even under severe conditions, provide high energy transfer characteristics and high efficiency, during intermittent and frequent irregular application of high torque loads, high temperature and extreme heat, maintain surface area contact, minimize slippage between the flywheel 50 and the clutch disk 14, improve long term energy transfer and efficiency, maintain material properties, and make the flywheel 50 light weight, durable, long lasting, and capable of being manufactured or retrofit with replacement parts quickly, easily, and efficiently.

The flywheel disk 54 may be of metal, such as titanium, aluminum, aluminum alloy, stainless steel, steel, ductile iron, cast iron, or other suitable material, the radially disposed channels 52 therethrough the flywheel disk 54 providing additional heat dissipation, increased structural integrity, with lighter weight, and decreased warpage of the flywheel disk 54. The arcuate shaped pads 58 may alternatively be of metal, such as titanium, aluminum, aluminum alloy, stainless steel, steel, ductile iron, cast iron, or other suitable material.

The flywheel 12 and the flywheel 50 may be used in the rotary friction system 10, or independently from the rotary friction system 10, the flywheel 12 and the flywheel 50 being capable of being used with alternate clutches, and the clutch disk 14 being capable of being used with alternate flywheels.

FIGS. 5–9 show the clutch disk 14 having disk 88, which has a plurality of arcuate shaped cutouts 90 for extending raised step portions 92 of arcuate shaped pads 94 therethrough, and mounting holes 96, for mounting the arcuate shaped pads 94 thereto the disk 88. Each of the arcuate shaped pads 94, which are preferably of carbon-carbon material or other suitable material, have substantially planar side 98, and opposing side 100 having mounting portions 102 and the raised step portion 92.

Thickness 104 of the raised step portion 92 above each of the mounting portions 102 of each of the arcuate shaped pads 94 is substantially the same as thickness 106 of theft mounting portions 102 of each of the arcuate shaped pads 94. The arcuate shaped pads 94 are mounted on the disk 88, the arcuate shaped pads 94 opposingly interleaved about the disk 88, the raised step portions 92 of the arcuate shaped pads 94 extending matingly therethrough the arcuate shaped cutouts 90 of the disk 88. The raised step portions 92 of the arcuate shaped pads 94 alternatingly extending therethrough the disk 88 in opposing directions in conjunction with adjacent ones of the mounting portions 102 of the arcuate shaped pads 94 form friction surfaces on both sides of the clutch disk 14.

The arcuate shaped pads 94 have countersunk holes 108 for receiving screws 110 or other suitable fasteners therethrough, which are inserted therethrough the mounting holes 96 of the disk 88, thus sandwiching the disk 88 therebetween adjacent opposing ones of the mounting portions 102 of the arcuate shaped pads 94, and fastening adjacent opposing ones of the mounting portions 102 of the arcuate shaped pads 94 thereto the disk 88, with nuts 112 or other suitable fasteners holding the screws 110 or other suitable fasteners in place.

Figure 5:
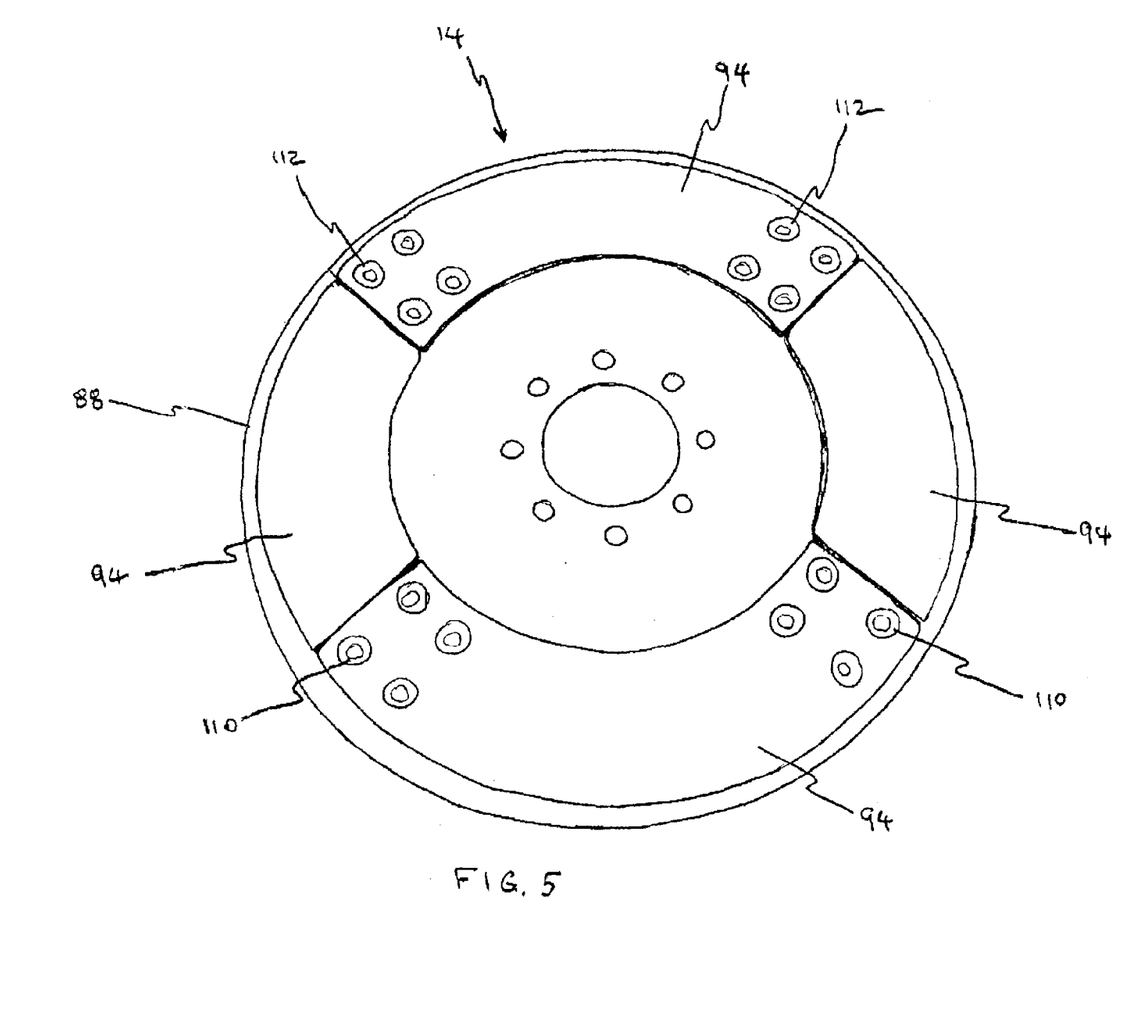
FIG. 5 is a perspective view of a clutch disk of the rotary friction system of FIG. 1.
Figure 6:
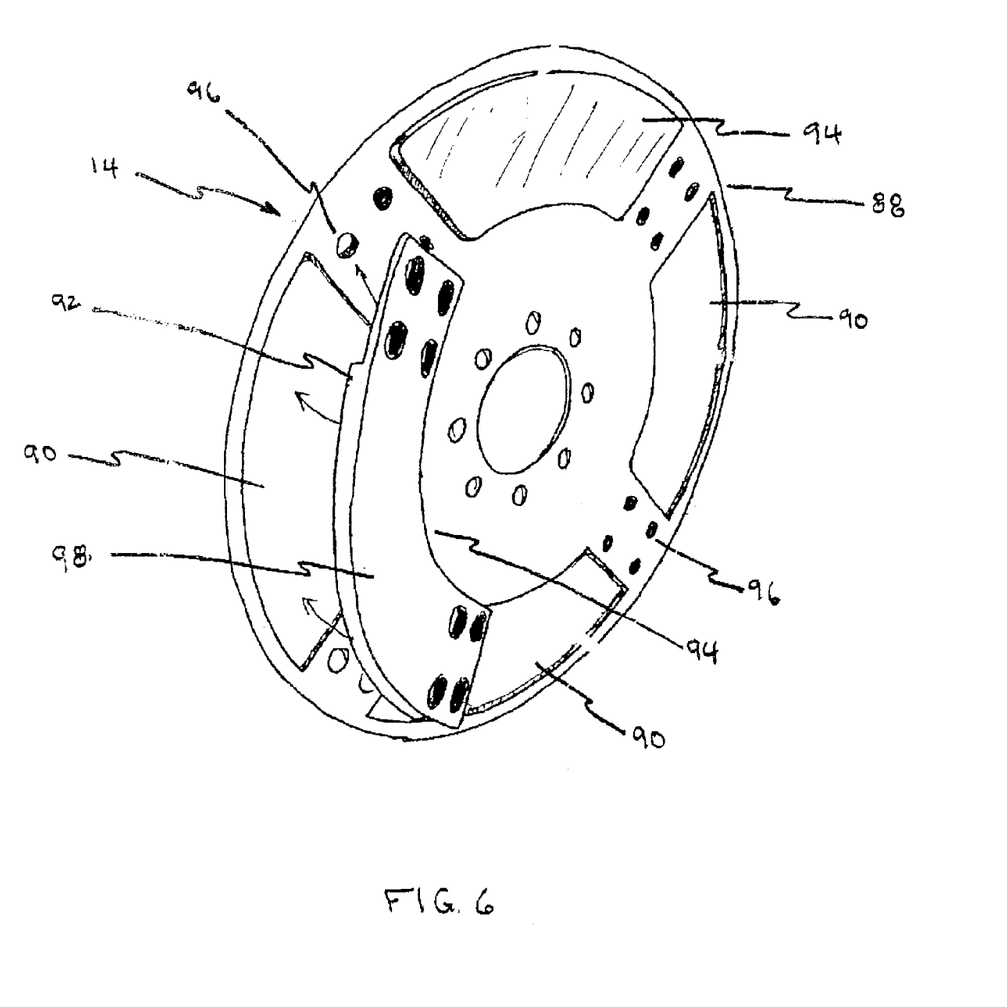
FIG. 6 is an exploded view of a portion of the clutch disk and two arcuate shaped pads of FIG. 5.
Figure 7:
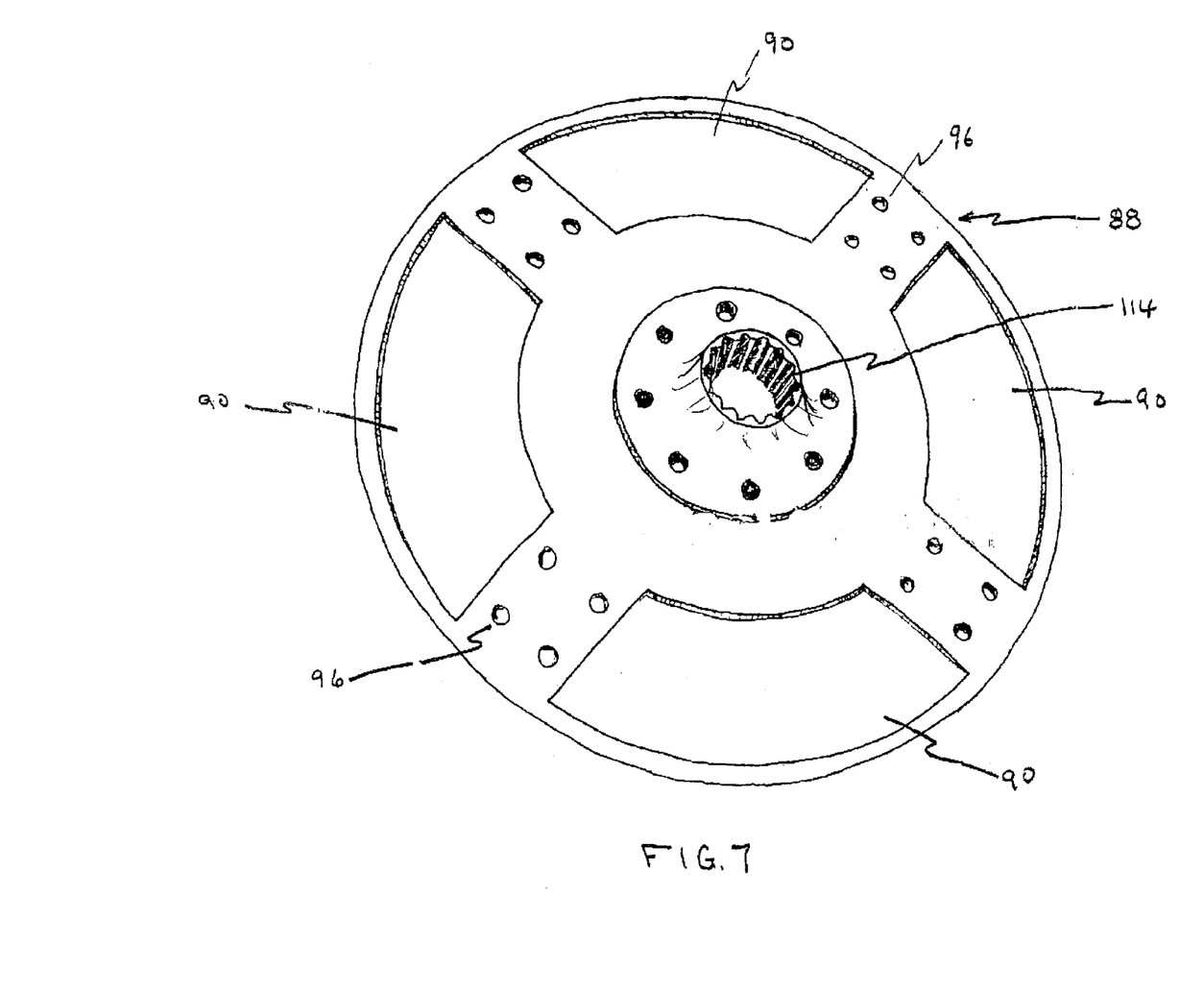
FIG. 7 is a perspective view of the clutch disk of FIG. 5, showing the clutch disk having arcuate shaped cutouts.
Figure 8:
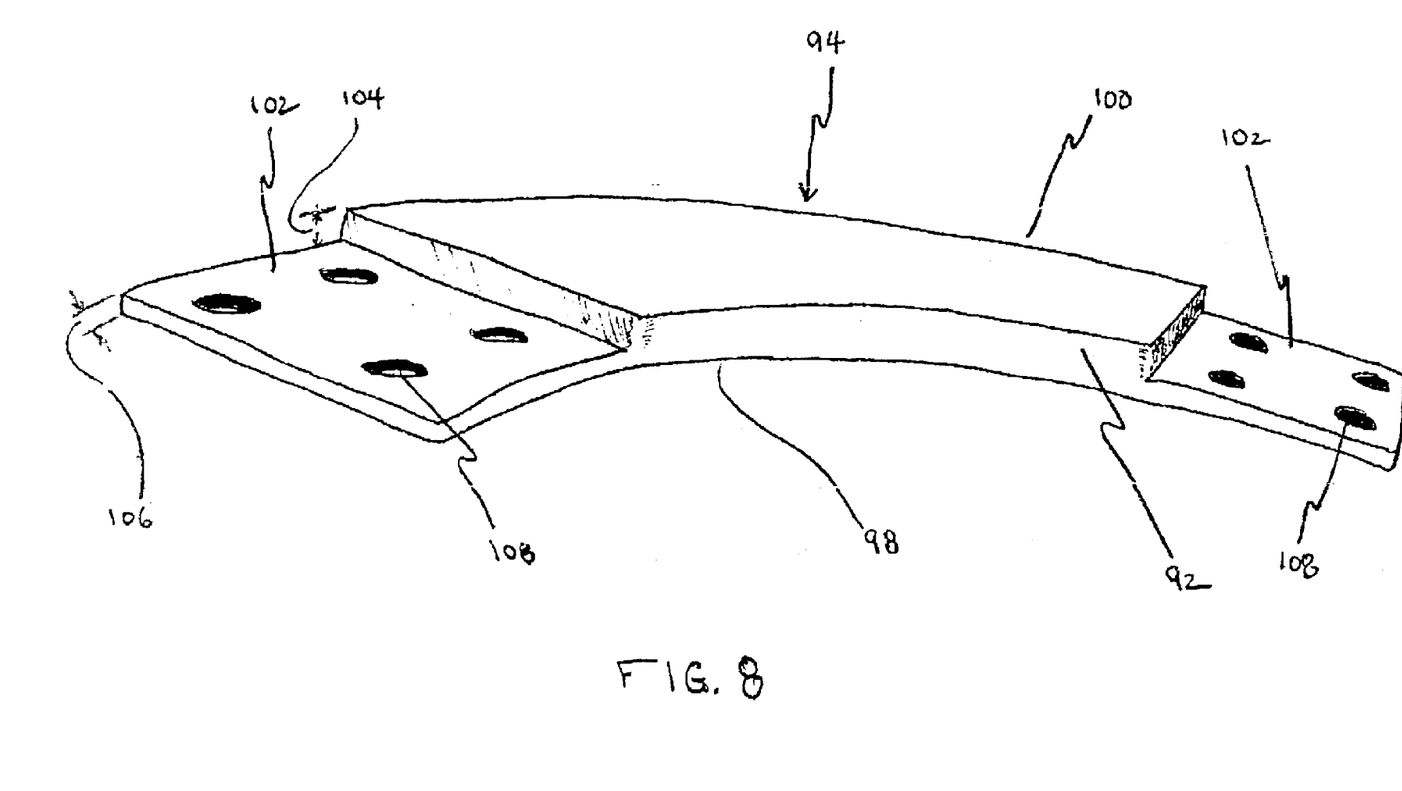
FIG. 8 is a perspective view of one of the arcuate shaped pads of FIG. 5.
Figure 9:
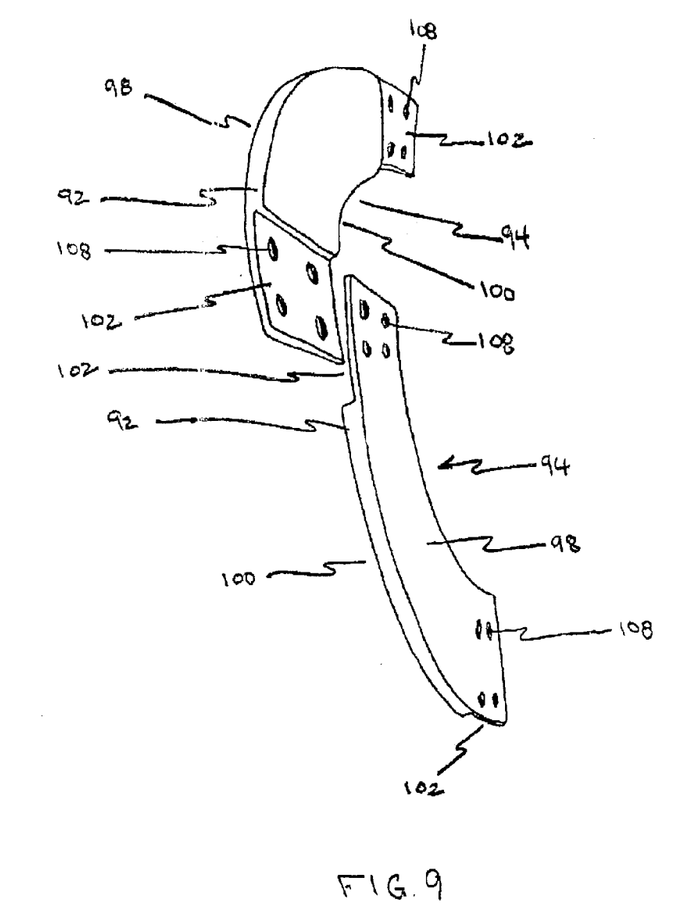
FIG. 9 is a perspective view of two of the arcuate shaped pads of FIG. 5, showing opposing sides and mounting configuration of the arcuate shaped pads.

The clutch disk 14 also has an internal spline gear 114, which may be fastened thereto the disk 88, or the clutch disk 14 may be constructed with the spline gear 114 integral with the disk 88. The internal spline gear 114 may be used to fasten the clutch disk 14 to a shaft or other device.

The arcuate shaped pads 94 of carbon-carbon material, or other suitable material, mounted thereto the disk 88, and having the raised step portions 92 extending therethrough the arcuate shaped cutouts 90 of the disk 88 provide the clutch disk 92 with improved performance, eliminate warping, even under severe conditions, provide high energy transfer characteristics and high efficiency, during intermittent and frequent irregular application of high torque loads, high temperature and extreme heat, maintain surface area contact, minimize slippage between the flywheel 50 or the flywheel 12 and the clutch disk 14, improve long term energy transfer and efficiency, maintain material properties, and make the clutch disk 14 light weight, durable, long lasting, and capable of being manufactured or retrofit with replacement parts quickly, easily, and efficiently.

The disk 88 may be of metal, such as titanium, aluminum, aluminum alloy, stainless steel, steel, ductile iron, cast iron, or other suitable material. The arcuate shaped pads 94 may alternatively be of metal, such as titanium, aluminum, aluminum alloy, stainless steel, steel, ductile iron, cast iron, or other suitable material.

Although the present invention has been described in considerable detail with reference to certain preferred versions thereof, other versions are possible. Therefore, the spirit and scope of the appended claims should not be limited to the description of the preferred versions contained herein.

What is claimed is:

1. A rotary friction system, comprising:
    a flywheel, comprising:
        a disk comprising a plurality of coaxially disposed arcuate shaped recesses and a plurality of radially disposed channels;
        arcuate shaped pads matingly mounted therein said arcuate shaped recesses;
    a clutch disk, comprising:
        another disk comprising a plurality of coaxially disposed arcuate shaped cutouts;
        a plurality of other arcuate shaped pads, each said other arcuate shaped pad having a raised step portion;
        said other arcuate shaped pads mounted thereon said other disk, having adjacent ones of said raised portions interleaved about said other disk, and extending matingly therethrough said arcuate shaped cutouts in opposing directions;
        said flywheel adjacent said clutch disk.

2. The rotary friction system according to claim 1, wherein said arcuate shaped pads and said other arcuate shaped pads are of carbon-carbon material.

3. The rotary friction system according to claim 1, wherein said arcuate shaped pads and said other arcuate shaped pads are of metal from the group consisting of: titanium, aluminum, aluminum alloy, stainless steel, steel, ductile iron, and cast iron.

4. The rotary friction system according to claim 1, wherein said radially disposed channels are internal thereto said disk.

5. The flywheel according to claim 1, wherein said disk and said other disk are of metal from the group consisting of: titanium, aluminum, aluminum alloy, stainless steel, steel, ductile iron, and cast iron.

6. The rotary friction system according to claim 1, wherein said arcuate shaped pads are of carbon-carbon material.

7. The rotary friction system according to claim 1, wherein said other arcuate shaped pads are of carbon-carbon material.

* * * * *